(12) United States Patent
Su et al.

(10) Patent No.: US 7,013,258 B1
(45) Date of Patent: Mar. 14, 2006

(54) SYSTEM AND METHOD FOR ACCELERATING CHINESE TEXT INPUT

(75) Inventors: Hui Su, Beijing (CN); Jingtao Wang, Beijing (CN); Shumin Zhai, San Jose, CA (US)

(73) Assignee: Lenovo (Singapore) Pte. Ltd., (SG)

( * ) Notice: Subject to any disclaimer, the term of this patent is extended or adjusted under 35 U.S.C. 154(b) by 863 days.

(21) Appl. No.: 09/801,979

(22) Filed: Mar. 7, 2001

(51) Int. Cl.
*G06F 17/00* (2006.01)

(52) U.S. Cl. .............................. 704/1; 704/3; 345/171; 345/688; 345/808

(58) Field of Classification Search .................... 704/1, 704/3; 345/688, 808
See application file for complete search history.

(56) References Cited

U.S. PATENT DOCUMENTS

| | | | | |
|---|---|---|---|---|
| 5,689,619 | A | | 11/1997 | Smyth .......................... 395/10 |
| 5,805,167 | A | * | 9/1998 | van Cruyningen .......... 345/808 |
| 5,850,211 | A | | 12/1998 | Tognazzini ................. 345/158 |
| 5,859,642 | A | | 1/1999 | Jones .......................... 345/352 |
| 5,999,895 | A | * | 12/1999 | Forest ........................... 704/1 |
| 6,014,615 | A | * | 1/2000 | Chen ............................. 704/3 |
| 6,421,064 | B1 | * | 7/2002 | Lemelson et al. .......... 345/688 |
| 6,848,080 | B1 | * | 1/2005 | Lee et al. ................... 715/533 |

FOREIGN PATENT DOCUMENTS

JP   2000-250699   9/2000

OTHER PUBLICATIONS

Shumin Zhai et al. "Manual and Gaze Input Cascaded (MAGIC) Pointing," Proc. CHI'99: ACM Conference on Human Factors in Computing Systems, 246-253, Pittsburgh, Pp 15-20 May 1999.
Jacob, "What You Look at is What You Get: Eye Movement User Interfaces," IEEE Computer, vol. 26, No. 7, Pp 65-67, Jul. 1993.

* cited by examiner

*Primary Examiner*—David D. Knepper
*Assistant Examiner*—Qi Han
(74) *Attorney, Agent, or Firm*—Samuel A. Kassatly (57) ABSTRACT

A Chinese text entry system with eye-tracking technique can be used for computer input of Chinese characters. The system is comprised of two main components: the Chinese pinyin software and the eye-tracking system. Chinese characters corresponding to pinyin input are selected from a list of candidate characters by selecting the proper character through eye-tracking identification and confirming the selection by pressing a readily accessible confirmation key. The Chinese pinyin software implements pinyin input at both the character and word level, choosing from multiple character or word homonyms as pinyin is entered. The system uses eye-tracking technology that is only used to identify the correct Chinese character, with the character selection and entry occurring when the confirmation key is pressed.

24 Claims, 10 Drawing Sheets

SYSTEM AND METHOD FOR ACCELERATING CHINESE TEXT INPUT

FIELD OF THE INVENTION

The present invention relates to the field of computer text entry of a logographic based language in which a symbol represents a word or a phrase. Particularly, the present invention relates to the text entry of Chinese characters. More specifically, this invention relates to a software system and associated method for use with an eye-tracking module to assist in the identification and selection of Chinese characters for text entry.

BACKGROUND OF THE INVENTION

Text entry is one of the most frequent human/computer interaction tasks. Although speech and handwriting recognition techniques by computers have improved, typewriting (or keyboarding) remains the main text-entry method. Once learned, touch typing on a keyboard offers two critical characteristics: rapid speed and attention on the screen. A skilled typist can type over 60 words per minute, far beyond the typical 12 words per minute produced by handwriting. In addition, touch-typing frees the user's visual attention so the user can focus on the text entry task instead of the keyboard or hands.

Numerous difficulties in touch-typing arise when the text-input language is Chinese (or any other language based on logographic characters). Currently, one of the most popular methods used for Chinese text input is pinyin input. Pinyin, approved in 1958 by the Chinese Government, is the official Chinese phonetic alphabet based on Roman characters. For example, in pinyin the Chinese character 中(center, middle) is "zhong" and the pinyin for the word "北京" consisting of two Chinese characters is "Beijing". An overwhelming majority of computer users in China use pinyin or some variation of it for computer input. Other non pinyin-based Chinese text input methods exist for encoding the logographic Chinese characters, but the amount of learning and memorization required by these methods has prevented them from becoming popular.

The complication to pinyin input is that most Chinese characters are homophonic on a wide scale. In Mandarin Chinese, there are only about 410 distinct syllables while there are 6,763 Chinese characters in the national standard database GB2312. Consequently, each syllable corresponds to 16.8 characters on average, notwithstanding the relatively small number of characters with multiple pronunciations. When a user types the pinyin of a character such as "zhong", the computer software for Chinese text input displays many candidate characters with the same pronunciation, numbered for selection purposes. The display is typically a "page", usually a one-line graphical window. The first eight candidate characters for "zhong" could be 1 中 2 种 3 重 4 众 5 种 6 终 7 忠 8 肿 having the following meanings:

1. center; 2. type; 3. heavy; 4. mass; 5. kind; 6. finale; 7. loyal; and 8. swollen, respectively.

The user must then select a choice from the candidate list by typing the identifying number, e.g., the number "1" for the character corresponding to "center". If more than eight characters correspond to a pinyin word, pressing the "page down" key displays additional candidates also numbered 1 to 8 which may be selected as before.

This multiple choice selection process renders current pinyin input much less efficient than typing in alpha-based languages. A major source of this inefficiency is the difficulty of touch-typing a numeric key to select the target character. On a standard "QWERTY" keyboard typing the numeric keys may be much more difficult than typing the alphabetic keys. This is due in part to the distance between the numeric keys and the "home row" where the hand naturally rests during typing, i.e., the ASDFGHJKL keys.

In addition, many if not most typists have to look at and then type the numeric keys. If the character candidates for the pinyin word exceed one "page", the typist must also "page down" to view additional candidates, consuming additional time. Consequently, the two important advantages of touch-typing, speed and the low demand for visual attention, both suffer when Chinese input is required. A text entry system for Chinese input that avoids numeric keying and thus maintains the user's touch-typing ability is a compelling goal in Chinese text input.

Another source of inefficiency in Chinese language text entry is the choice reaction time, i.e., the time required to choose the correct character from the list presented by the text entry software program. Numerous methods have been proposed to reduce the frequency and number of choices in pinyin-based input.

These methods can be categorized in the one or more of the following five categories:

1. Using additional keystrokes to represent the shape or structure of a Chinese character.

2. Enabling the user to input both characters and words. A Chinese word is usually composed of one, two or three Chinese characters. If the user types the pinyin of "北京" (Beijing) separately as 'bei' and 'jing', the two syllables have 29 and 40 candidates respectively. If the user types them as one unit, then only two candidates "1 北京 2 背景" (1. Beijing; 2. Background) are likely choices in daily language.

3. Using a Chinese language model to reduce the uncertainty at the phrase or sentence level. The language model can either be rule-based or based on bigrams or trigrams, which are commonly used in speech recognition.

4. Adding the Chinese intonation information after the pinyin of a character (the four tones in Chinese pronunciation are often encoded as 1–4 for addition entry).

5. Continuous completion, wherein the system continuously composes possible choices based on the pinyin characters typed. As the pinyin stream grows longer, the number of possible choices is reduced until the user decides to select a character.

Though the foregoing proposed measures help to reduce the choice reaction time, they do not completely eliminate it. A system is therefore needed to further minimize the amount of time and attention required to choose and enter the appropriate character.

Current eye-tracking technology uses the eye gaze as a direct control channel to move a cursor on the screen, or to assist in entering text. Reference is made to U.S. Pat. No. 5,859,642 to Jones, and Zhai, S. Morimoto, C., Ihde, S., "Manual And Gaze Input Cascaded (MAGIC) Pointing," Proc. CHI' 99, pages 246–253, Pittsburgh, Pa., USA, 15–20 May 1999. However, there are two deficiencies in using eye-tracking technology for direct control. First, eye gaze cannot be very precise given the one-degree size of the fovea and the subconscious jittery motions that the eyes constantly produce. Second, the eye is not naturally suited for deliberate control functions. At times, eye movement is voluntary while at other times the eye moves involuntarily in response to external events. Current eye-tracking systems cannot easily distinguish deliberate eye movement from accidental eye movement.

To use eye-tracking technology in text entry of Chinese characters, a system is needed which allows the eye to select the desired Chinese graphic without requiring long-term deliberate control of the eye movement. Such a system would use eye movement to highlight the Chinese character while the user presses a key to select that character for entry. Alternatively, the system would use the eye gaze information implicitly when the user presses on a common or readily accessible, confirmation key that can be touch-typed, the candidate character the user is looking at is selected. The need for such a system has heretofore remained unsatisfied.

SUMMARY OF THE INVENTION

One feature of the system and method of the present invention is to multiplex eye-tracking technology and keyboard input to increase the speed in text entry of a logographic based language, and in particular Chinese characters. When used to input Chinese characters, the system of the invention is comprised of two components: A Chinese pinyin software application program with eye-gaze or visual recognition input, and an eye-tracking component with a selection input device.

As it will be described later, while the selection input device will be described herein in connection with a keyboard or a keypad, it should be clear that other selection inputs may alternatively be used. The Chinese text input system solves the character selection problem by using eye tracking and a selection input device. As an example, the selection input device can be a common key such as the control key, the enter key, the space bar, or a special key added to the keyboard for this purpose. When the user presses the common key, the candidate character that the user is viewing is confirmed as the desired character.

The system of this invention takes advantage of the fact that the user must already visually scan the candidate characters to identify the right choice. As the user scans the candidate characters, the scanned character can be highlighted. At which time, the user presses an easy-to-reach key designated (or programmed) as the confirmation key by the system. This key can be the space bar, the control key, the enter key, or a special key added to the keyboard for this purpose. Alternately, the system could use a foot pedal, mouse button, a pad tap, a voice command to confirm the choice of a logographic character, or any other suitable input confirmation technique.

Visually scanning the candidate characters for the desired choice is part of the choice reaction time in text entry of Chinese characters. Allowing the user to select the character based on visual recognition reduces the choice reaction time to only that time required to see the character and press a predetermined confirmation key. In addition, allowing the user to simply look at the appropriate character then press a confirmation key provides the natural use of the eye for selecting the character. In contrast to standard eye-tracking technology, the user is not required to stare at the character for a predetermined amount of time or blink to select the character, and the gaze tracking need not be activated all the time during input.

The placement of the candidate characters on a "page" or window at the bottom of the screen accommodates the limitations of eye-tracking technology. The typical eye-tracking accuracy is about one visual degree; therefore, the candidate character size is larger than one visual degree. In addition to the linear candidate display order in traditional pinyin text input, the candidate characters can also be arranged in two rows in a "w" shape, with three characters on the top row and two characters on the bottom row, in order to maximize the distances among the candidate characters. To display seven characters, a zig-zag pattern is used with three characters on the top row and four characters on the bottom row. To maximize the reliability of the eye-tracking system, the most frequently used candidate character can be displayed in the middle of the screen and the space between the characters can become larger toward the edge of the screen.

As the user enters a pinyin syllable, the system of the invention displays the candidate characters in order of frequency of usage, with the most frequently used character for that pinyin displayed in the middle of the screen. As the user adds pinyin syllables to the Chinese word being entered, the system chooses from multiple character or word homonyms. The software component of the present invention can accommodate, for example the 6,763 Chinese characters in the National Standard GB-2312 1980 as well as 9,425 most frequently used Chinese words. The multiple character or word homonyms for the same pinyin are arranged in the order of usage frequency as collected from a large Chinese corpus.

The system of the invention can use eye-tracking systems that are readily available. One such eye-tracking system is described in co-pending U.S. patent application Ser. No. 09/052,321, which is incorporated herein by reference in its entirety. The implementation of the eye-tracking system for use with Chinese character input is novel. Rather than use the eye to control the movement of a cursor or deliberately control any other function of the system of the invention, this system uses eye tracking implicitly when the confirmation key is pressed. The eye tracking component is activated while pressing the confirmation key. The eye tracking component can also be activated to highlight the character during the visual scanning procedure.

The system of the present invention is not limited to highlighting the candidate characters using eye gaze technology. Rather, the system can use the user's eye gaze implicitly when the selection key is pressed. As a result, the eye tracking system is not required to be activated all the times. It may only be activated while the selection key is pressed.

Because of the limited use of essentially tracking one line of candidates characters, the eye-tracker used can be a simplified from a full two dimensional eye-tracker to one-dimensional tracker, which may reduce the tracker's cost and difficulty of use.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

Page: A graphical window on the computer screen that displays a selection of candidate characters matching the pinyin entered by the typist.

Pinyin: The official Chinese phonetic alphabet based on Roman characters. The official Pinyin standard was approved by P.R.China in the 5$^{th}$ Meeting of the 1$^{st}$ People's congress Council in February, 1958.

Figure 1:
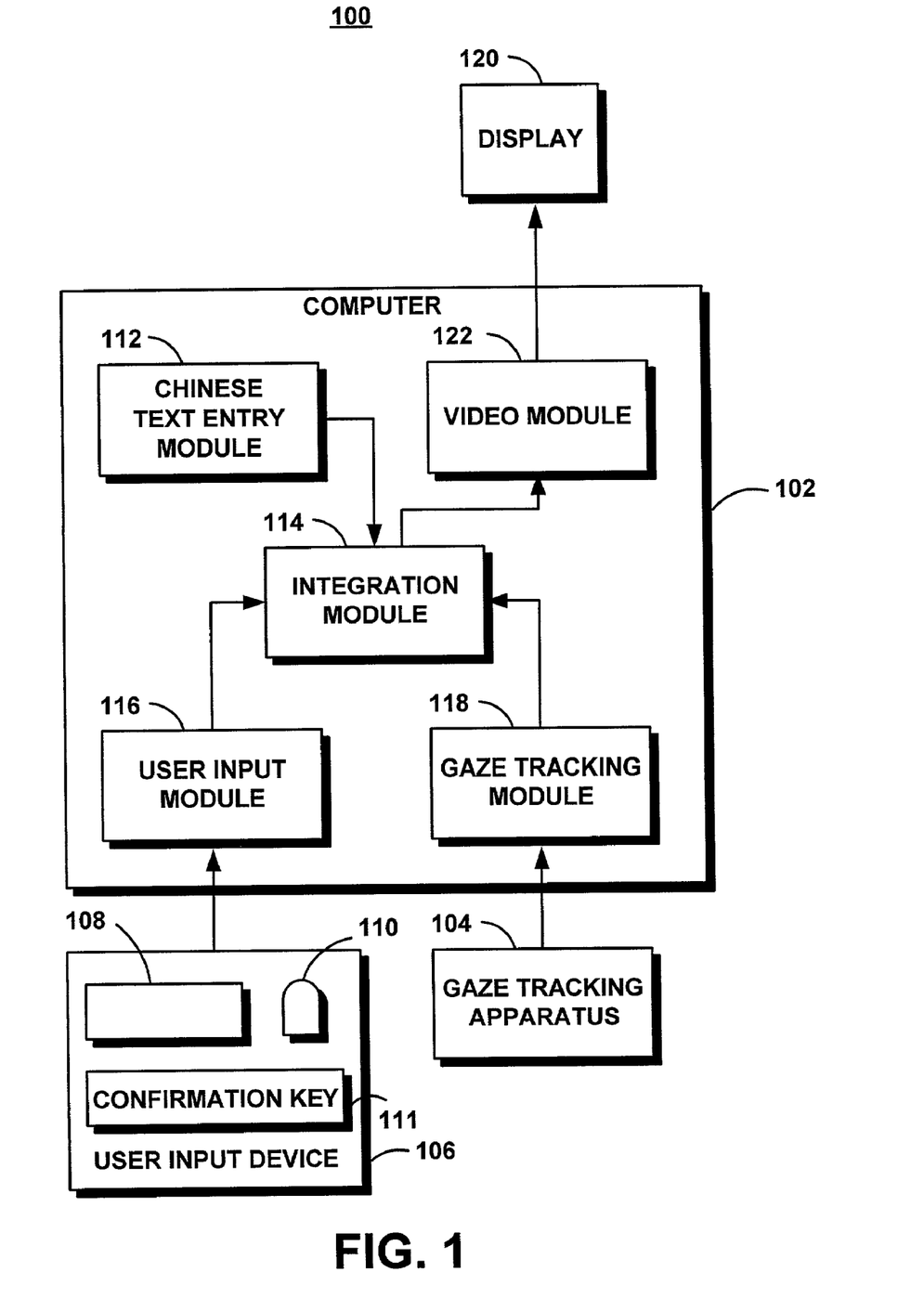
FIG. 1 is a block diagram of the hardware architecture of a system for accelerating the text input of Chinese characters according to the present invention.

FIG. 1 generally illustrates the main components and interconnections of a system 100 for accelerating Chinese text input. The system 100 includes a computer 102, a gaze tracking apparatus 104, a user input device 108 comprising a confirmation key 111, and a display 120.

The confirmation key 111 can be, for example, the space bar, the control key, the enter key, or a special key added to the keyboard for this purpose. Alternately, the system 100 could use a foot pedal, mouse button, a pad tap, a voice command to confirm the choice of a logographic character, or any other easily accessibly input device. In a preferred embodiment, the space bar is the confirmation key 111.

A Chinese text entry module (also referred to as program or application) 112 is installed on the computer 102. Though this module 112 is referred to herein as "Chinese" text entry module, it should be clear that this module is not limited to Chinese characters, and that it can be used with other logographic based languages.

The gaze tracking apparatus 104 monitors the eye gaze of the computer user (also referred to herein as operator). The gaze tracking apparatus 104 may use many different techniques to monitor eye gaze, depending upon the particular needs of the desired application. As one example, the gaze tracking apparatus 104 may employ one or more of the following:

1. Electro-Oculography: This technique places skin electrodes around the eye, and records potential differences that are representative of eye position.

2. Corneal Reflection: This technique directs an infrared light beam at the operator's eye and measures the angular difference between the operator's mobile pupil and the stationary light beam reflection.

3. Lumbus, Pupil, and Eyelid Tracking: These techniques include scanning the eye region with an apparatus such as a television camera or other scanner and analyzing the resultant image.

4. Contact Lens: This technique uses a device attached to the eye with a specially manufactured contact lens. With the "optical lever," for example, one or more plane mirror surfaces ground on the lens reflect light from a light source to a photographic plate or photocell or quadrant detector array. Another approach uses a magnetic sensor in conjunction with contact lenses with implanted magnetic coils.

A number of different gaze tracking approaches are surveyed in the following reference: Young et al., "Methods & Designs: Survey of Eye Movement Recording Methods," Behavior Research Methods & Instrumentation, 1975, Vol. 7(5), pp. 397–429. Ordinarily skilled artisans, having the benefit of this disclosure, will also recognize a number of different devices suitable for use as the gaze tracking apparatus 104.

As a specific example of a gaze tracking approach for use in the present invention, reference is made to the following patents:

(1) U.S. Pat. No. 4,836,670 to Hutchison;

(2) U.S. Pat. No. 4,950,069 to Hutchison; and (3) U.S. Pat. No. 4,595,990 to Garwin et al.

Also, although the invention's gaze tracking apparatus 104 may be a custom product, a commercially available product may be used instead, such as the EyeTrac Series 4000 product by Applied Science Labs, or the EyeGaze system by LC Technology.

Although the software programming associated with the gaze tracking apparatus 104 may be included with the apparatus 104 itself, the particular example of FIG. 1 illustrates the associated software implemented in a gaze tracking module 118 which is described more fully below. The gaze tracking module 118 may be included solely in the computer 102, in the gaze tracking apparatus 104, or in a combination of these two components, depending upon the particular application.

Advantageously, the present invention is capable of accurate operation with inexpensive, relatively low-resolution gaze tracking techniques. For instance, significant benefits can be gained with gaze tracking accuracy±3 degrees, which is a low error requirement for gaze tracking systems. With this level of permissible error, the gaze tracking apparatus 104 may comprise an inexpensive video camera, many of which are known and are becoming increasingly popular for use in computer systems.

The user input device 106 comprises an operator input device with an element sensitive to pressure, physical contact, or other manual activation by a human operator. This is referred to as "manual" input that "mechanically" activates the input device 106 and selects the desired Chinese character or other logographic character.

As an example, the device 106 may include one or more of the following: a computer keyboard, a mouse, "trackball", a foot-activated switch or trigger, pressure-sensitive transducer stick such as the IBM TRACKPOINT®, a touch pad, tongue activated pointer, and/or another mechanically activated device. In the particular embodiment illustrated in FIG. 1, a keyboard 108 and a mouse 110 are shown. Although the software programming associated with the input device 106 may be included with the device 106, the particular example of FIG. 1 shows the necessary input device software implemented in the user input module 116, described more fully below. The user input module 116 may be included solely in the computer 102, the user input device 106, or a combination of the both components.

The display 120 provides an electronic medium for optically presenting text and graphics to the user. The display 120 may be implemented by any suitable computer display with sufficient ability to depict graphical images including a cursor. As an example, the display 120 may employ a cathode ray tube, liquid crystal diode screen, light emitting diode screen, Thin Film Transistor (TFT), or any another suitable monitor. The images of the display 120 are determined by signals from the video module 122, described more fully below. The display 120 may also be referred to by other names, such as video display, video screen, display screen, video monitor, display monitor, etc. The cursor shown on the display 120 may comprise an arrow, bracket, short line, dot, cross-hair, or any other image suitable for selecting targets, positioning an insertion point for text or graphics, etc.

The computer 102 includes the Chinese text entry application text entry module 112, the user input module 116, the gaze tracking module 118, an integration module 114, and the video module 122. The computer 102 may be selected from any number of different products such as a known personal computer, computer workstation, mainframe computer, or another suitable digital data processing device. As an example, the computer 102 may be an IBM THINK-PAD® computer.

The video module 122 comprises a product that generates video signals representing images. These signals are compatible with the display 120, and cause the display 120 to show the corresponding images. The video module 122 may be provided by hardware, software, or a combination. As a more specific example, the video module 122 may be a video display card, such as an SVGA card.

The user input module 116 is configured to receive and interpret signals from the input device 106. As a specific example, the module 116 may include a mouse driver that receives electrical signals from the mouse 110 and that provides an x-y output representing the position of the mouse 110.

Similarly, the gaze tracking module 118 is configured to receive and interpret signals from the gaze tracking apparatus 104. As a specific example, the module 118 may include a software program or application that receives electrical signals from the gaze tracking apparatus 104 and that provides an x-y output representing a point where the operator is calculated to be gazing, called the "gaze position."

In use, the Chinese text entry module 112 is supplemented by operator input. This input includes text, which is entered via the user input device 106. The user selects the positional information of the target character such as by positioning a cursor. The gaze tracking apparatus 104 then selects the target Chinese character from a set of displayed characters supplied by the Chinese text entry module 112. The user then selects the target Chinese character by performing an operation such as pressing a "confirmation key" or "clicking" the mouse 110.

As it will be explained in greater detail below, the integration module 114 serves to integrate manual operator input from the user input module 116 and the input device 106 with the eye gaze input from the gaze tracking apparatus 104 and the gaze tracking module 118. The integration module 114 applies specific criteria to the input from the gaze tracking apparatus 104 and the user input device 106, to identify the Chinese character that is highlighted on the display 120.

Accelerating text entry of Chinese characters is a novel application of eye-tracking technology. The efficacy of the system and method for accelerating Chinese text input using the system 100 is determined through a combination of human performance modeling and experimentation.

It has been determined that typing a character or word in a pinyin-based system is an interaction task composed of a series of sub-tasks, including:

$t_1$: cognitively generating the pinyin of the Chinese character to be typed;

$t_2$: typing the pinyin syllable into the computer;

$t_3$: choice reaction time for visually identifying the target character in a row of candidate characters, and if the expected character is not found in the first row of candidates, pressing the page down or page up key and scanning the next list of candidates, and repeating these steps until the desired character is found; and $t_4$: number typing time for typing the numeric key corresponding to the target character.

Figure 2:
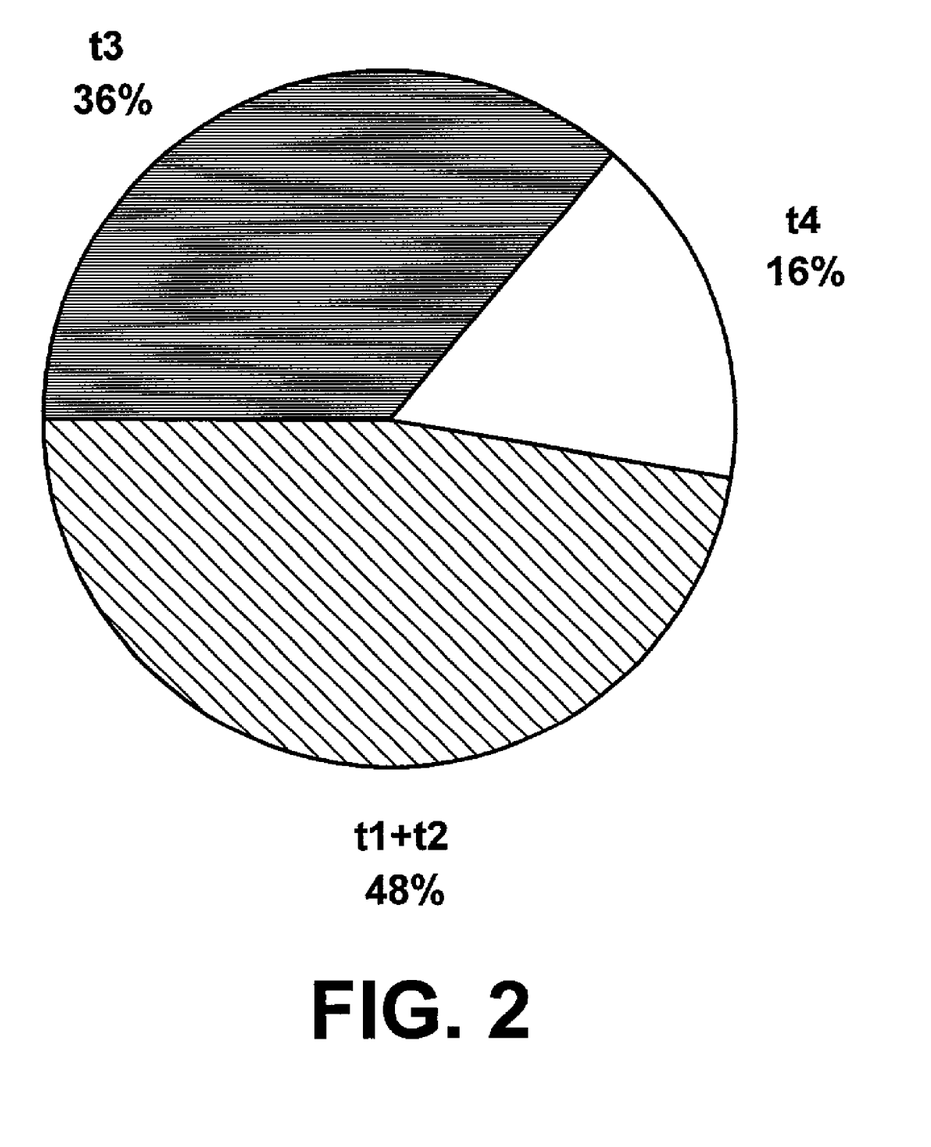
FIG. 2 represents a graphical illustration of time composition estimates of pinyin Chinese characters input.

With reference to FIG. 2, the total time T to input one Chinese character or word is therefore:

$$T=t_1+t_2+t_3+t_4.$$

The choice reaction time, $t_3$, and the number typing time, $t_4$, are typically the performance bottleneck in Chinese text input. It is one purpose of the system 100 to reduce choice reaction time, $t_3$, and the number typing time, $t_4$, through a combination of text entry software program with eye-tracking technique. The text-entry software program reduces the choice reaction time by placing the most likely character candidate in the center of the screen for the user to see and identify as quickly as possible. The eye-tracking technique replaces the various actions required to find and press a number key corresponding to the target character, with a single repeatable movement such as pressing a common key to confirm that the viewed character is correct. In addition, the system 100 uses pinyin word combinations as well as syllables to produce the most likely candidate as quickly as possible.

The system 100 reduces the combination of the choice reaction time, $t_3$, and the number typing time, $t_4$, compared to standard Chinese text-entry. In fact, the distance the typist reaches to type the number keys on the top row degrades the human open-loop motor control accuracy, making it difficult to type correctly without visual guidance. The system 100 addresses this problem by eliminating the actions of selecting and typing number keys.

The chart of FIG. 2 illustrates that generating and typing pinyin (i.e., components $t_1+t_2$) takes only about half the total time. Multiple choice processing (i.e., component $t_3$) accounted for another 36%, which could be for example about 780 ms for each choice selection, verifying that multiple choice processing is the major slowdown of pinyin input. Typing the choice selection entry (i.e., component $t_4$) accounted for the remaining 16% of entry time.

The system 100 performs as well as a standard Chinese text entry without the need to type numeric keys, allowing the user to focus attention on the computer screen or text-entry documents. This reduces errors and increases input speeds when the user is entering large blocks of text for long periods. The system 100 reduces the time component, $t_4$, with a significant time saving of the total input time T. Entry time is reduced even more when the system 100 provides word candidates as well as character candidates in response to pinyin entry.

Figure 3:
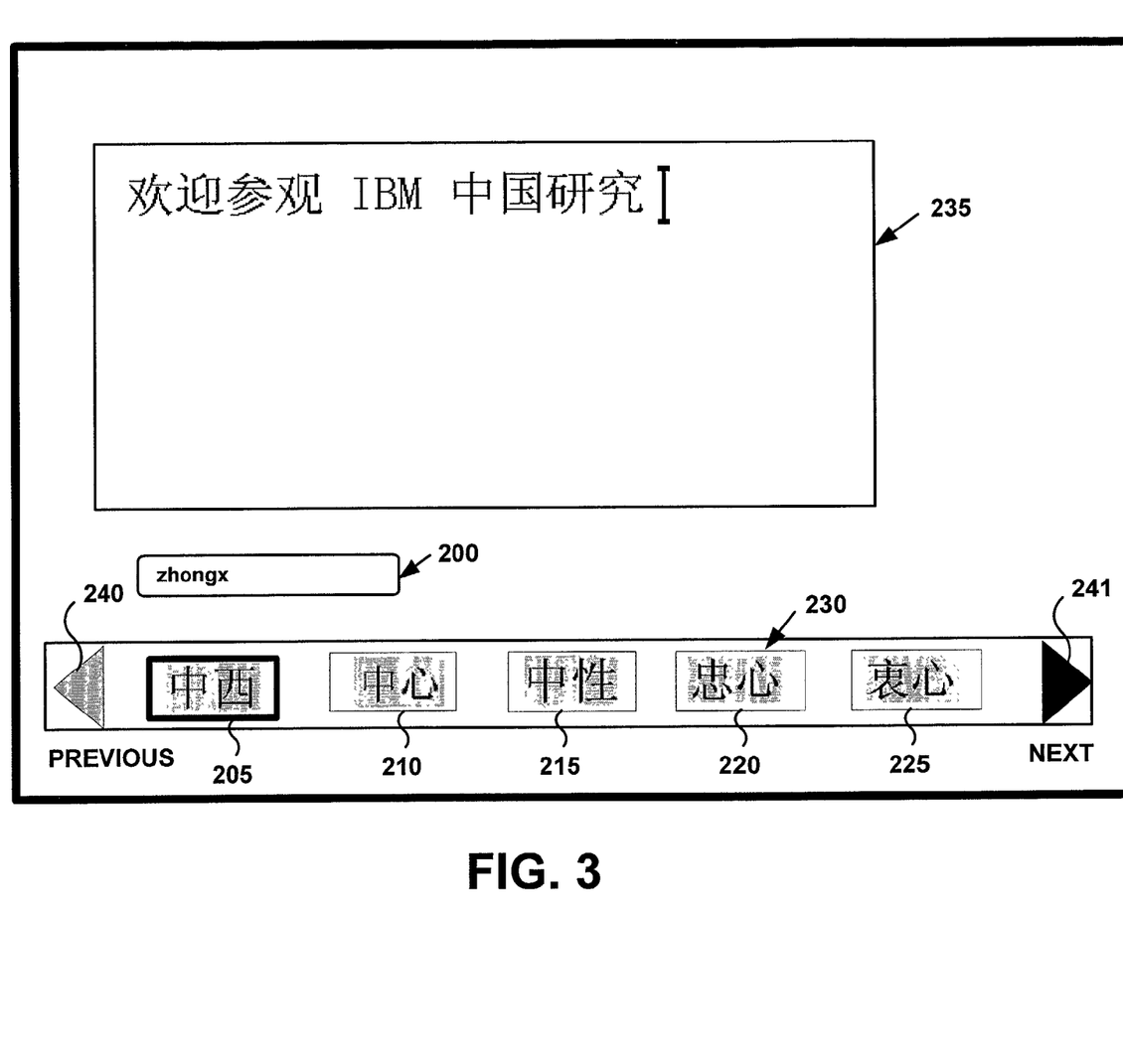
FIGS. 3 through 9 represent a sequence of text entry screens further illustrating the system of FIG. 1, according to the method of FIG. 10.

An exemplary user interface screen of the system 100 is depicted in FIG. 3 as seen by the user on the display 120 of FIG. 1. The user starts by typing the pinyin syllables in an input tracking bar 200. While typing, the system 100 displays Chinese candidate characters 205, 210, 215, 220, and 225 in a gaze-tracking panel 230 according to the partial or full syllables typed. The candidate character in the current user gaze focus in the gaze-tracking panel 230 can be emphasized or highlighted with black character strokes as for candidate character 205. Character strokes for candidates that are not in the current user gaze focus are displayed in gray (i.e., grayed out) as shown by candidate characters 210, 215, 220, and 225. Both pinyin and their chosen Chinese characters are displayed in a character output area 235.

In an alternative embodiment of the system 100, the input tracking bar 200 could show the candidate characters designated with selection numbers as for traditional Chinese text entry.

A scrolling indicator, such as a previous page (or page up) arrow 240, or a next page (or page down) arrow 241 can also be selected by eye-gazing.

Though the present display 120 shows only five candidate characters 205, 210, 215, 220, 225, it should be clear that a different number can be either pre-selected by the user, pre-set by the system 100, or programmable to reflect the various typing conditions.

In a preferred embodiment, the candidate characters are arranged in a single row, as shown in FIG. 3. In another embodiment, the candidate characters 205, 210, 215, 220, 225 could be arranged in two or more rows in, for example, a "W" shape, with three characters, i.e., 205, 210, 225 on a top row and two characters 210, 220 on a bottom row.

As an example, to display seven characters, a zig-zag pattern is used with three characters on the top row and four characters on the bottom row. To maximize the reliability of the system 100, the most frequently used candidate character, i.e., 215, can be displayed in the middle of the gaze-tracking panel 230.

In use, and with reference to FIGS. 3 through 10, the user types, at step 300 (FIG. 10), the pinyin syllable "Huanying nin can guan IBM zhongguo yanjiu zhongxin. Zhe". The above pinyin stream composed of two parts, one is a sentence which means "Welcome to visit IBM China Research Lab.", the other part—syllable "zhe", stands for a single character "浙" in this context, which means a province name in China. We use the input procedure of this character to show how to do page down operations and select candidate from the next page.

The letters for the pinyin syllable concurrently appear in the input tracking bar 200 and the character output area 235. As the entry of the pinyin is completed, the system 100 displays, at step 305, the candidate character list, comprised in this example of candidate characters 205, 210, 215, 220, 225 for that pinyin, in the gaze-tracking panel 230. In one embodiment, the most frequently used candidate character can be preselected (i.e., highlighted) and displayed in the center of the gaze-tracking panel 230, or at another easily visible location to facilitate and expedite the selection process. Various methods can be used to select the most frequently used or the most likely candidate character.

Figure 10:
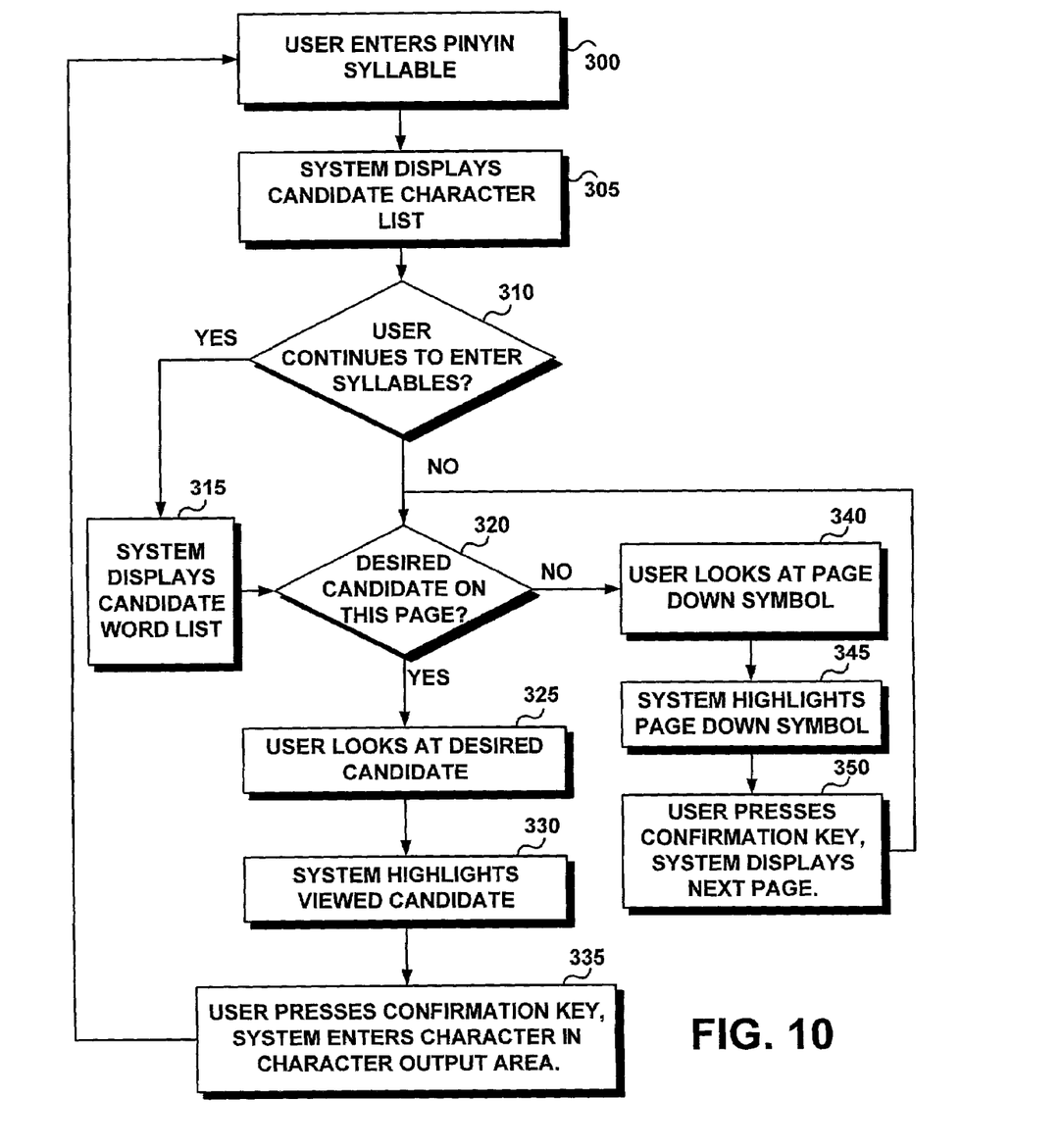
FIG. 10 is a flow chart that depicts a method of using the system of FIG. 1.

If at step 310 the user enters additional pinyin syllables (or characters), the system 100 replaces the candidate character list with a candidate word list at step 315, wherein a word is a collection of two or more syllable. The system 100 then inquires at decision block 320 if the desired candidate character is displayed in the gaze-tracking panel 230. If no additional pages are required to display all the candidates characters in the candidate character or word list, as in FIG. 3, a page down arrow is not displayed (or is disabled), and the system 100 proceeds to step 325.

Figure 4:
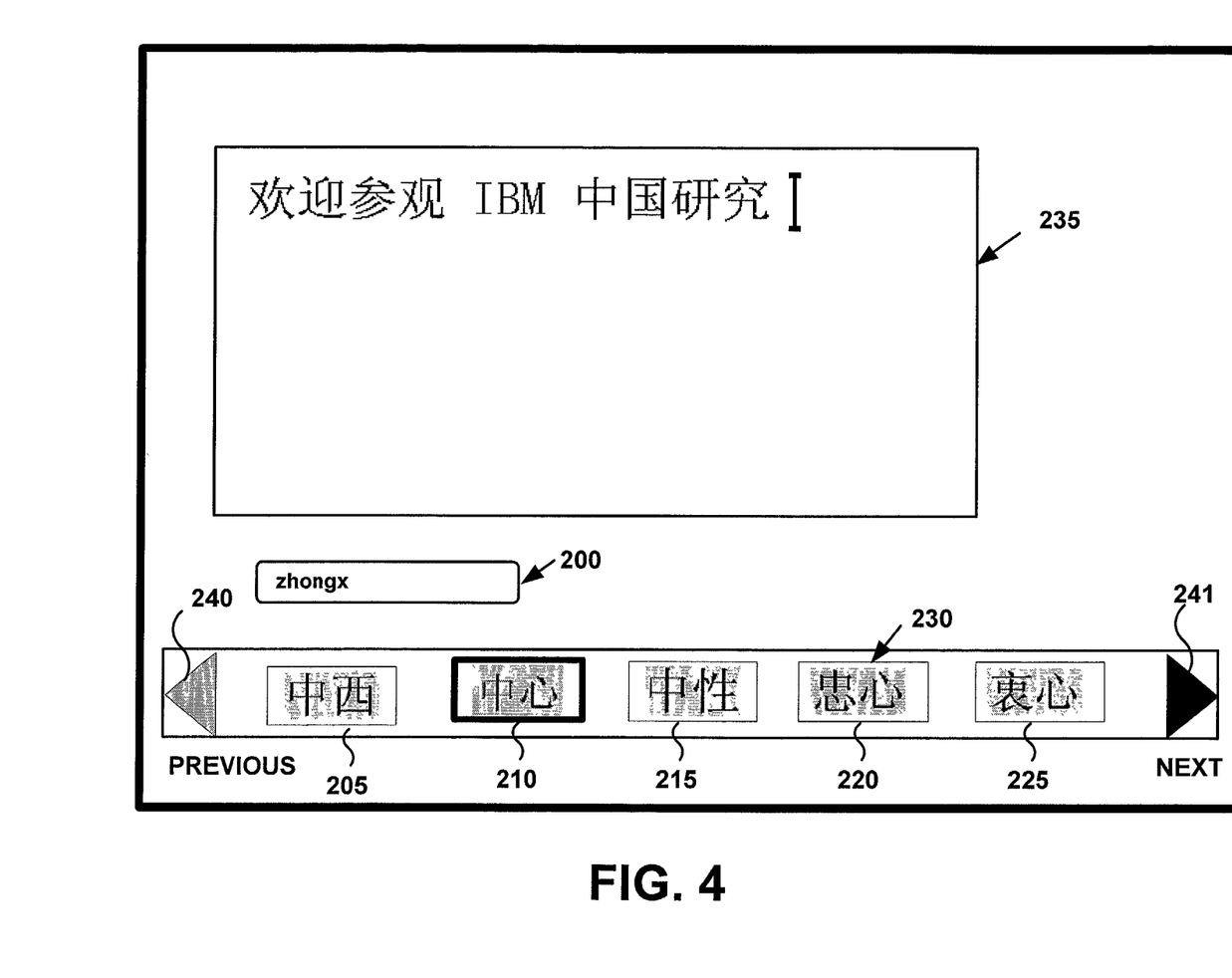

With reference to FIG. 4, as the user visually scans the gaze-tracking panel 230 seeking the proper candidate at step 325, the system 100 highlights, at step 330, another candidate character such as 210. The previously highlighted candidate character 205 is grayed out, similarly to the other non selected (i.e., visually selected by gazing) candidate characters 215, 220, 225.

The user's direct gaze causes the highlight of the candidate character to move in one direction or another, such as the direction from a previous candidate character 205 to a currently viewed candidate character 210, and further causes the previous candidate character 105 to be become gray that is unselectable (or unselected). The steps of gazing through the candidate characters, the highlighting and the deselection of candidate characters continues until a target character is found.

Figure 5:
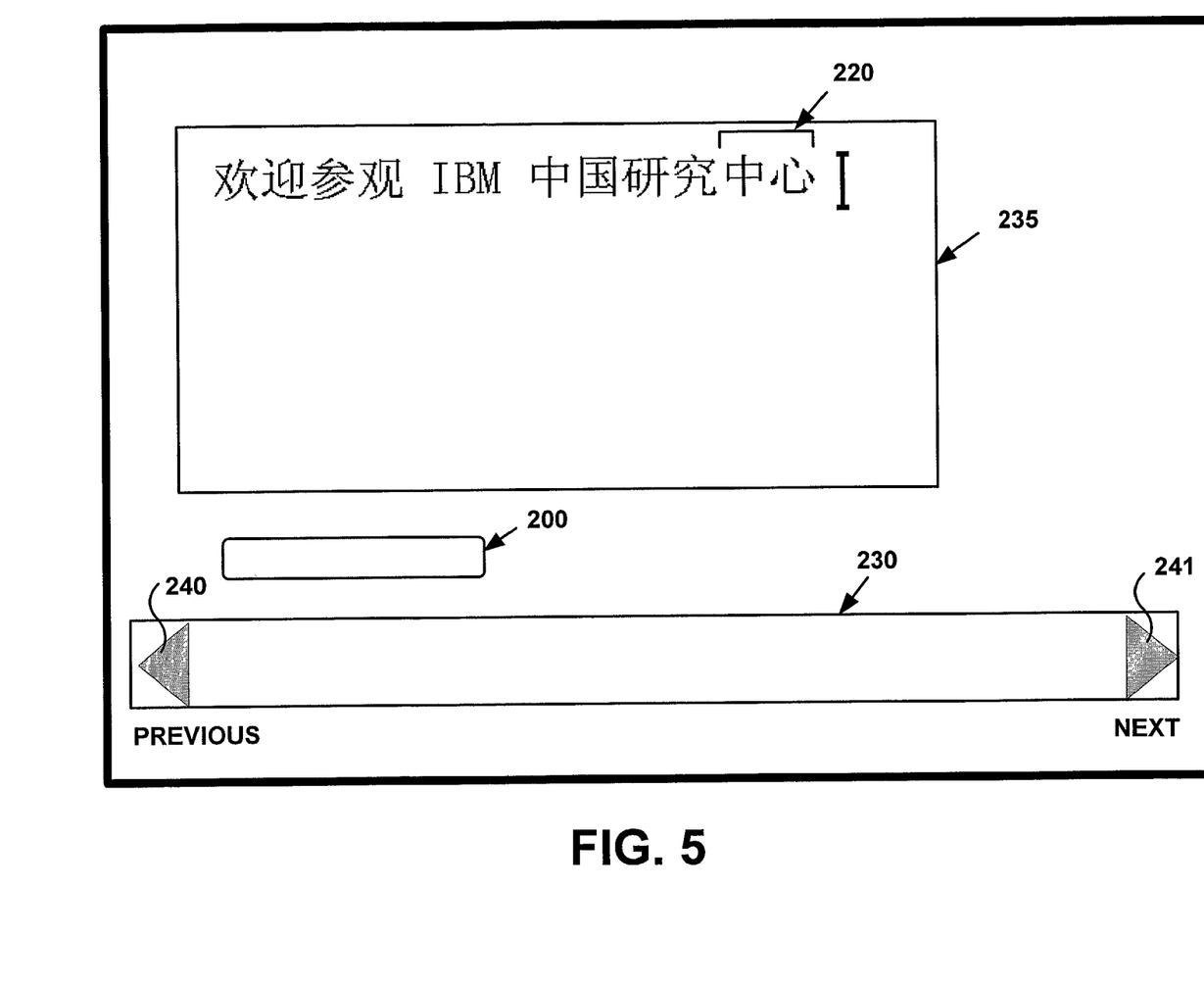

At which stage, and in order for the user to select the target character, i.e., 210 (step 335), the user simply presses the confirmation key 111 (FIG. 1) to enter the selected (or target) character 210 in the character output area 235. As illustrated in FIG. 5, when the target character 210 is selected, it is moved from the gaze-tracking panel 230 to the character output area 235, and the entry and candidate characters in the input tracking bar 200 and the gaze-tracking panel 230 are cleared in anticipation of further entry of pinyin syllables at step 300.

Figure 6:
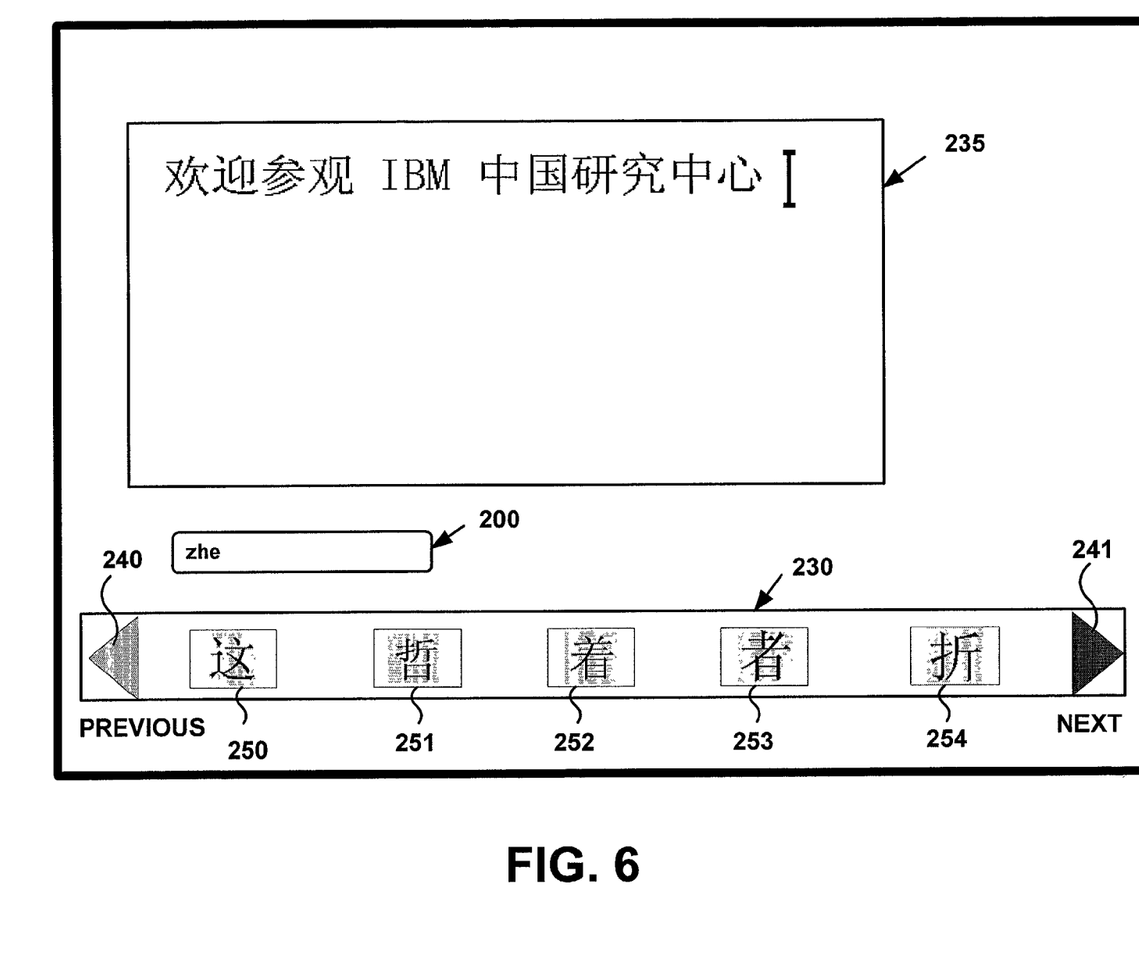

At step 300 of FIG. 10, and with reference to FIG. 6, the user now types the pinyin "zhe" that appears in the input tracking bar 200, and five possible candidate characters 250, 251, 252, 253, 254 are concurrently displayed in the gaze-tracking panel 230 (step 305). If the user determines that the desired target character is not among the five displayed candidate characters 250, 251, 252, 253, 254 on this first page (FIG. 6), the user looks (or gazes) at the next page (or page down) arrow 241 (step 340), and the system 100 highlights the next page arrow 241 at step 345.

Figure 7:
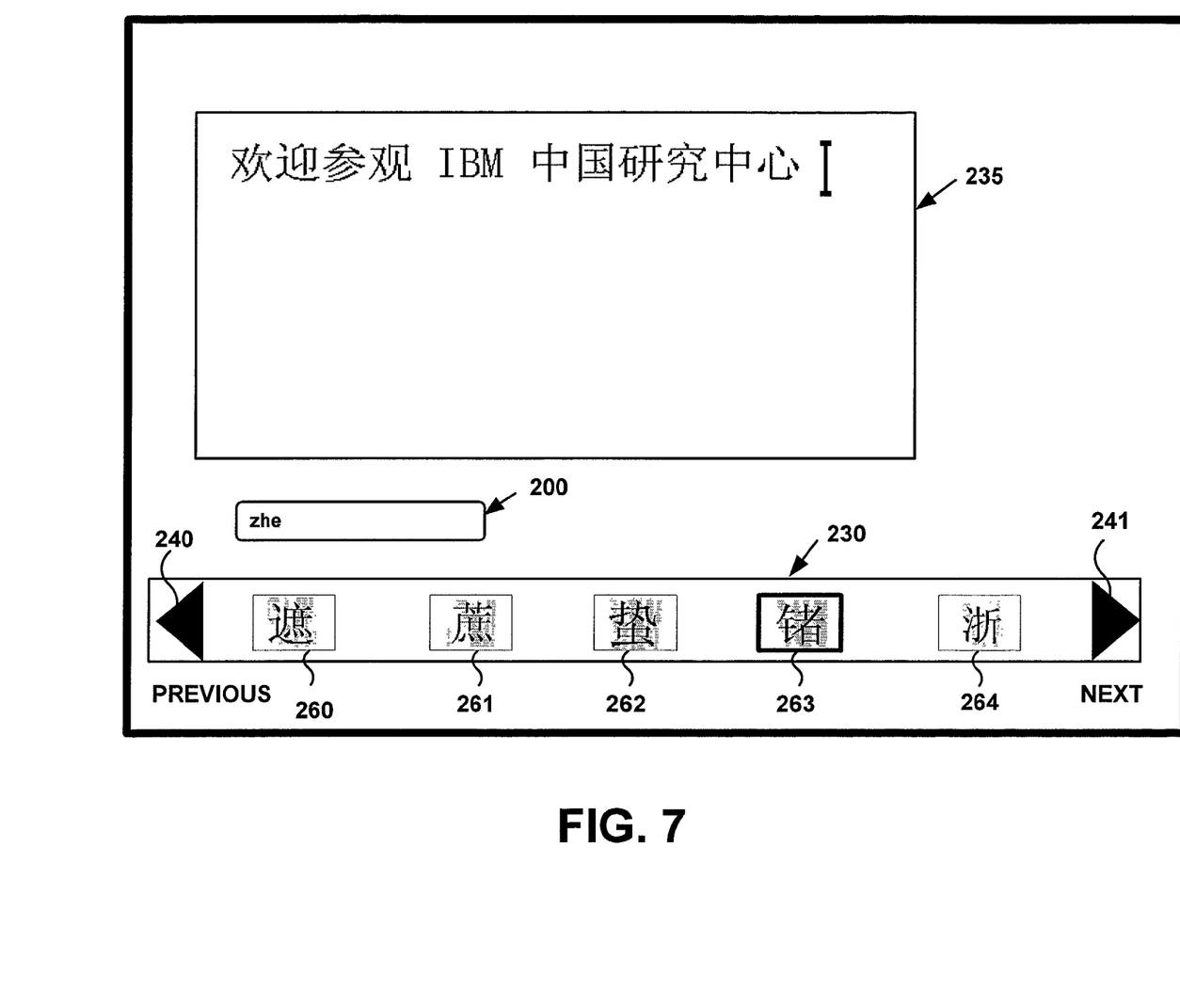
Figure 8:
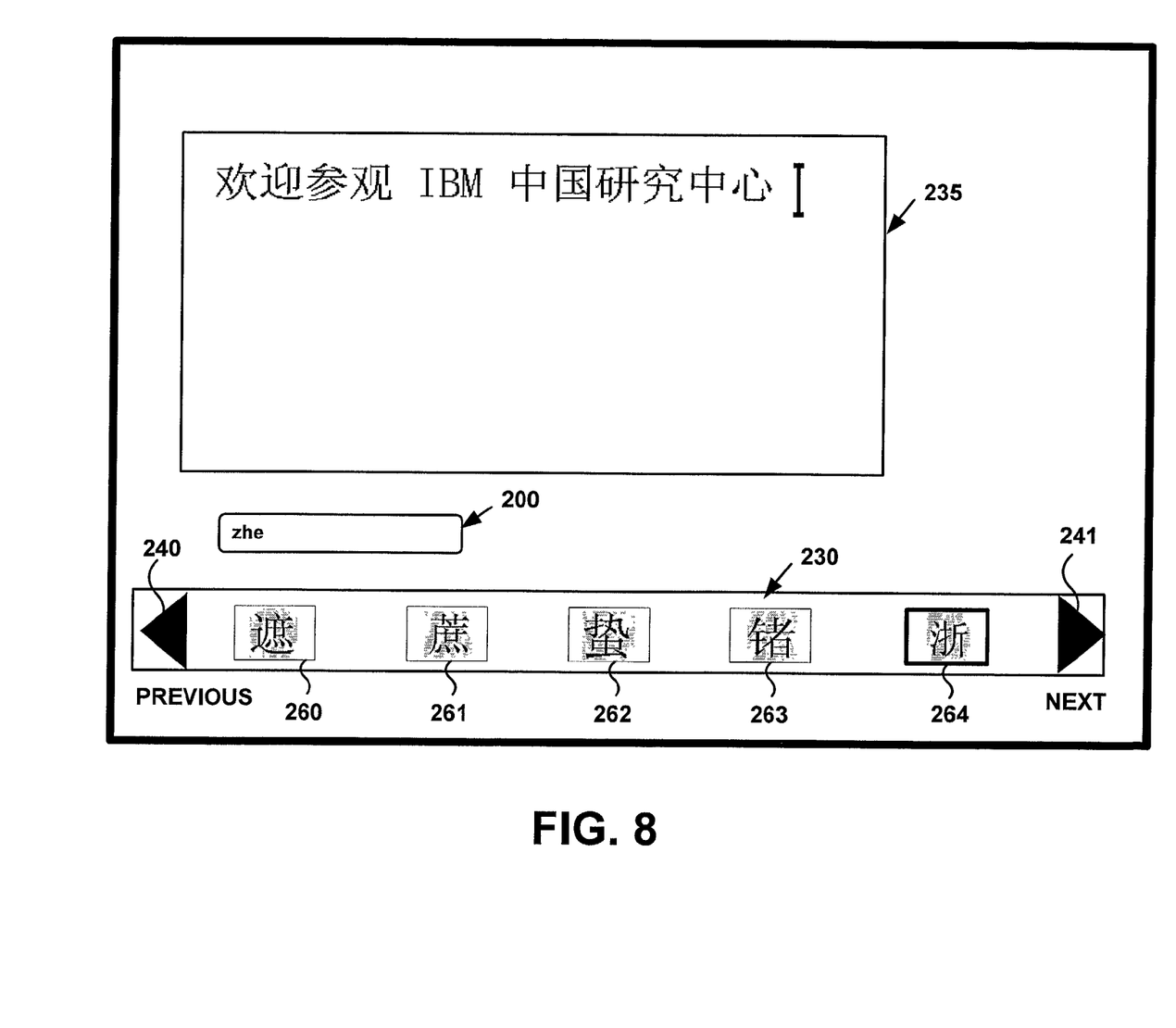

The user presses the confirmation key 111 at step 350 to activate the "page down" command, displaying five new candidate characters 260, 261, 262, 263, 264 on the next page (FIG. 7). The user scrolls through these candidate characters until he or she find the target character. In the example illustrated in FIG. 7, the candidate character 263 is highlighted, indicated that it is being considered (or scrolled) by the user.

If the current page is the last page of available candidate characters, the next page arrow 241 automatically transforms into a previous page arrow 240 (or enables the former disabled "previous page" arrow). The user may repeat steps 340 through 350 until the appropriate page is displayed. At this appropriate page (FIG. 8), the user selects the target character 264 by gazing at it (step 325) so that it is highlighted (step 330), and then pressing the confirmation key 111.

Figure 9:
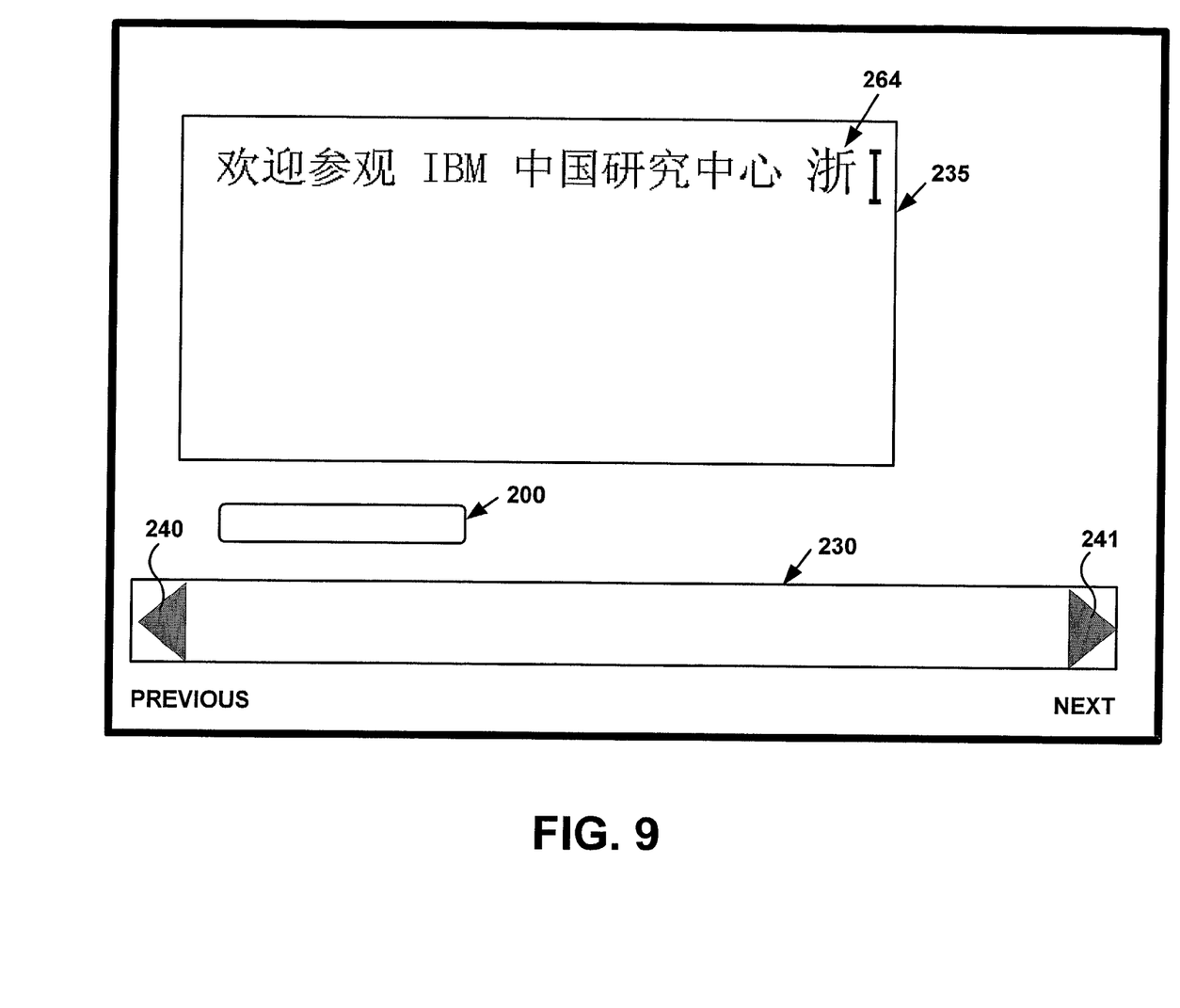

As illustrated in FIG. 9, when the target character 264 is selected, it is moved from the gaze-tracking panel 230 to the character output area 235, and the entry and candidate characters in the input tracking bar 200 and the gaze-tracking panel 230 are cleared in anticipation of further entry of pinyin syllables at step 300. As pinyin entry continues, the system 100 and the user interact to repeat steps 300 through 350 until all the desired entries are completed.

It is to be understood that the specific embodiments of the invention that have been described are merely illustrative of certain applications of the principle of the present invention. Numerous modifications may be made to the system and method for Chinese text entry with keyboarding and eye-tracking described herein without departing from the spirit and scope of the present invention. Moreover, while the present invention is described for illustration purpose only in relation to Chinese text entry, it should be clear that the invention is applicable as well to entry of any character-based language or to any entry based on multiple choice selection.

What is claimed is:

1. A method of inputting text entry of a logographic based language, comprising:
   typing at least some initial pinyin characters representing a logographic based text;
   based on the typed initial pinyin characters, displaying one or more candidate logographic characters for a target logographic character among the candidate logographic characters;
   tracking a user's eye natural looking position at the displayed candidate logographic characters;
   based on the user's eye natural looking position, pre-selecting one or by visibly emphasizing the candidate logographic characters, without requiring deliberate staring at the pre-selected one or more candidate logographic characters, in order to select the target logographic character; and
   selecting the target logographic character from among the one or more pre-selected candidate logographic characters by multiplexing the user's eye natural looking position and a single confirmation input command.

2. The method of claim 1, further including activating the single confirmation input command by manually pressing a single confirmation key.

3. The method of claim 2, wherein the step of displaying one or more candidate characters includes displaying Chinese characters.

4. The method of claim 3, wherein the step of pre-selecting one or more candidate characters includes highlighting the pre-selected candidate characters.

5. The method of claim 3, wherein the step of pressing the single confirmation key includes pressing any one or more of: a space bar, a control key, an enter key, a dedicated key, a foot pedal, a mouse button, a pad tap.

6. The method of claim 3, wherein the step of activating the single confirmation input command includes entering a voice command.

7. The method of claim 3, wherein the step of displaying includes displaying the candidate characters in order of frequency of usage.

8. The method of claim 7, wherein the step of displaying includes displaying a most frequently used candidate character in a pre-selected position.

9. The method of claim 3, wherein the step of displaying includes displaying the candidate characters in a single row.

10. The method of claim 3, wherein the step of displaying includes displaying the candidate characters in a staggered arrangement.

11. A system for accelerating text entry of a logographic based language, comprising:
    an input device for typing at least some initial Pinyin characters representing a logographic based text;
    an eye-tracking apparatus that monitors a user's eye natural looking position;
    a display for visually displaying logographic characters of the logographic based language based on the typed initial characters;
    an input tracking bar that displays inputted characters;
    a panel that displays the logographic characters based on the typed initial characters, and that allows a pre-selection of the one or more candidate logographic characters by visibly emphasizing the candidate logographic characters and by tracking the user's eye natural looking position without requiring deliberate staring at the preselected one or more candidate characters, in order to select a target character;
    a user input device that generates a single confirmation input command for enabling the selection of the target character by multiplexing the user's eye natural looking position and the single confirmation input command; and
    a character output area that displays the selected target character.

12. The system of claim 11, further including a scrolling indicator that enables scrolling action between multiple pages.

13. The system of claim 11, wherein the single confirmation input command includes a single manual confirmation key.

14. The system of claim 13, wherein the single confirmation key includes any one or more of: a space bar, a control key, an enter key, a dedicated key, a foot pedal, a mouse button, a pad tap.

15. The system of claim 11, wherein the candidate characters include Chinese characters.

16. The system of claim 11, wherein the eye-tracking apparatus visually highlights pre-selected candidate characters.

17. The system of claim 11, wherein the single confirmation input command includes a voice command.

18. The system of claim 11, wherein the display displays candidate characters in order of frequency of usage.

19. A computer program product having a plurality of executable instruction codes for inputting text entry of a logographic based language, comprising:
    an input device for typing at least some initial Pinyin characters representing a logographic based text;
    a first set of instruction codes for displaying logographic characters for a target character among the candidate characters, based on the typed initial characters;
    a second set of instruction codes for tracking a user's eye natural looking position;
    a third set of instruction codes for pre-selecting logographic characters, by visibly emphasizing the candidate logographic characters based on the user's eye natural looking position, without requiring deliberate staring at the pre-selected one or more candidate characters, in order to select the target character; and
    a fourth set of instruction codes for selecting the target character from among the one or more pre-selected candidate characters by multiplexing the user's eye natural looking position and a single confirmation input command.

20. The computer program product of claim 19, further including a sixth set of instruction codes for activating the single confirmation input command by manually pressing a single confirmation key.

21. The computer program product of claim 20, wherein the first set of instruction codes displays Chinese characters.

22. The computer program product of claim 21, wherein the third set of instruction codes pre-selects the one or more candidate characters by highlighting the pre-selected candidate characters.

23. The computer program product of claim 21, wherein the single confirmation key includes any one or more of: a space bar, a control key, an enter key, a dedicated key, a foot pedal, a mouse button, a pad tap.

24. The computer program product of claim 21, wherein the sixth set of instruction codes activates the single confirmation input command in response to a voice command.

* * * * *